United States Patent
Nakamura et al.

(10) Patent No.: US 7,368,148 B2
(45) Date of Patent: May 6, 2008

(54) FABRICATION PROCESS OF COLOR FILTERS, INKS, COLOR FILTERS, AND IMAGE DISPLAYS USING THE COLOR FILTERS

(75) Inventors: Michiei Nakamura, Chuo-ku (JP); Shigeru Sakamoto, Chuo-ku (JP); Toshio Yamaguchi, Chuo-ku (JP); Mamoru Tsukano, Chuo-ku (JP); Toshiyasu Fujita, Chuo-ku (JP); Akio Yoshida, Chuo-ku (JP)

(73) Assignee: Dainichiseika Color & Chemicals Mfg. Co., Ltd., Tokyo (JP)

( * ) Notice: Subject to any disclaimer, the term of this patent is extended or adjusted under 35 U.S.C. 154(b) by 248 days.

(21) Appl. No.: 11/037,087

(22) Filed: Jan. 19, 2005

(65) Prior Publication Data

US 2005/0193906 A1    Sep. 8, 2005

(30) Foreign Application Priority Data

Jan. 19, 2004  (JP) .............................. 2004-010336
Jul. 22, 2004  (JP) .............................. 2004-214582

(51) Int. Cl.
*B05D 5/06*  (2006.01)
(52) U.S. Cl. ................... 427/162; 427/355; 101/211
(58) Field of Classification Search ............. 427/162, 427/355; 101/211
See application file for complete search history.

(56) References Cited

U.S. PATENT DOCUMENTS 5,330,799 A * 7/1994 Sandor et al. ............. 427/510
5,609,943 A * 3/1997 DeKoven et al. .......... 428/195.1
2002/0025184 A1 2/2002 Ishikawa et al.

FOREIGN PATENT DOCUMENTS

| CN | 1344769 A | 4/2002 |
| CN | 108847 C | 8/2002 |
| JP | 60-225802 | 11/1985 |
| JP | 2003-322715 | 11/2003 |

OTHER PUBLICATIONS

Machine translation of JP 2003-322715; JPO, 2007.*

* cited by examiner

*Primary Examiner*—Alain L. Bashore
(74) *Attorney, Agent, or Firm*—Oblon, Spivak, McClelland, Maier & Neustadt, P.C.

(57) ABSTRACT

Color filters can each be fabricated by printing a pixel pattern for the color filter on a flexible plastic film by a central impression cylinder press. The pixel pattern is formed of pixels of three primary colors consisting of red, green and blue or pixels of three primary colors consisting of yellow, magenta and cyan. Also disclosed are inks, color filters, and image displays using the color filters.

3 Claims, 1 Drawing Sheet

FIG.1

FABRICATION PROCESS OF COLOR FILTERS, INKS, COLOR FILTERS, AND IMAGE DISPLAYS USING THE COLOR FILTERS

TECHNICAL FIELD

This invention relates to a fabrication process of color filters (hereinafter abbreviated as "CFs"), inks, CFs and image displays using the CFs. More specifically, the present invention is concerned with CFs each fabricated by printing images of three primary colors on a CF film by a central impression cylinder press either directly or via a mask having perforations (i.e., openings through which pixel-forming inks pass, respectively) and held in place on one side of the film, said one side being the side on which printing is to be performed, materials useful in the fabrication of the CFs, and a fabrication process of the CFs. Further, the present invention pertains to CFs, which show excellent performance in image characteristics such as fineness and definition as the quality of displayed images, permit the rationalization of fabrication steps and can be fabricated economically at low cost, and also to image displays equipped with the CFs.

BACKGROUND ART

Keeping in step with the recent tremendous developments in information equipment, color LCDs have found widespread commercial utility as information display units in all equipment relating to the display of information, for example, as display screens in personal computers, mobile information equipment, television sets, projectors, monitors, car navigation systems, cellular telephones, computers and electronic dictionaries, as displays such as information display boards, guidance display boards, function display boards and sign boards, and also as monitor screens in digital cameras and video cameras. As a consequence, CFs for color LCDs are also required to have still better quality in image characteristics such as sharpness. From the diversification of LCD applications, there is also diversification in size, resulting in an increasing demand for both smaller LCDs and larger LCDs. There is, accordingly, an outstanding demand for the supply of CFs at low cost for all such LCDs.

The fabrication of CFs relies upon a fabrication process called "the photolithographic process" in many instances. To form by this process a pixel pattern of the additive mixing system of three primary colors consisting of red (R), green (G) and blue (B), a photosensitive color resist (photosensitive ink) of one of the colors is coated on a CF substrate by a spin coater. Through a photomask prepared in advance and defining therethrough a light-transmitting pattern conforming with a pixel pattern of the corresponding color, ultraviolet rays are irradiated to cure the coated resist film. Unexposed portions of the coated resist film are then washed off to develop a pixel pattern of the specific color. With respect to each of the remaining two colors, the above-described procedure is repeated to fabricate a CF. The formation of a CF having a pixel pattern of three primary colors consisting of yellow (Y), magenta (M) and cyan (C) can be conducted likewise.

In the above-described photolithographic process, however, the amount of each resist with which its corresponding actual pixel pattern is formed as a result of the application by the spin coater is, for example, as little as only 10% or so of the actually-used amount of the same resist, and the majority of the resist is simply discarded. This is very uneconomical, and correspondingly, the resist with which the pixel pattern is formed is expensive.

With a view to providing a solution to the above-described problem, it has been attempted to reduce the loss of color resists by coating color films over the entire surfaces of plastic films, respectively, and then successively transferring the color films onto a CF substrate; or by applying the color resists onto a CF substrate by slit coaters, respectively. Both of these attempts, however, form pixels by the photolithographic process, and therefore, the problem that many steps are required still remains unsolved.

With a view to rationalizing the fabrication process to improve its economy, it was also attempted to fabricate CFs by a printing method. As the printing with the three RGB colors was performed color by color, misalignments took place among the printed pixels themselves, leading to reductions in the resolution and positional accuracy of the printed pixels. As a result, the CFs so fabricated were insufficient in the fineness, definition and the like of the pixels of the three primary colors.

An object of the present invention is, therefore, to fabricate CFs, which show excellent performance in image characteristics such as pixel fineness and definitions, by a fabrication process which can economically fabricate the CFs at low cost through rationalized steps and can also meet the move toward larger CFs; and also to provide CFs and image displays at low cost.

The present inventors have found that the use of a central impression cylinder press for the formation (printing) of a CF pixel pattern especially via a mask defining therethrough perforations which are in conformity with the pixel pattern makes it possible to form the pixel pattern with extremely high accuracy, to provide a CF of performance excellent in image characteristics such as image fineness and definition, and also to solve the above-described inherent defects of the conventional printing method such as insufficient resolution and positional accuracy.

DISCLOSURE OF THE INVENTION

The present invention, therefore, provides:

(1) A process for the fabrication of a CF, which comprises printing a pixel pattern for the CF on a flexible plastic film by a central impression cylinder press, wherein the pixel pattern is formed of pixels of three primary colors consisting of red, green and blue or pixels of three primary colors consisting of yellow, magenta and cyan.

(2) A process as described above under (1), wherein the flexible plastic film is a transfer or adhesion plastic film, and pixel patterns printed on the film are transferred or adhered onto a substrate for the CF.

(3) A process as described above under (1), wherein the pixel pattern is printed through a perforated mask which is in a positive-negative relationship with the pixel pattern, and subsequently, the mask is stripped off.

(4) A process as described above under (1), wherein the central impression cylinder press comprises a central impression cylinder and 3 to 10 printer units arranged in a form of satellites around the central impression cylinder.

(5) A process as described above under (3), wherein the perforated mask is a mask obtained by forming a mask film over the plastic film and then forming through the mask film perforations in the negative-positive relationship with the pixel pattern by laser abrasion.

(6) A process as described above under (3), wherein the perforated mask is a mask obtained by printing, on the plastic film, a film at areas other than those corresponding to the pixel pattern to be formed.

(7) A process as described above under (3), wherein the perforated mask is provided with an adhesive layer and is held in place on the plastic film via the adhesive layer.

(8) A process as described above under (3), wherein the perforated mask is formed of a material selected from the group consisting of (meth)acrylate ester-(meth)acrylic acid copolymers, styrene-(meth)acrylate ester-(meth)acrylic acid copolymers, styrene-(meth)acrylic acid copolymer, ethylene-vinyl acetate-(meth)acrylic acid copolymer, ethylene-(meth)acrylate ester-(meth)acrylic acid copolymers, and soluble salts thereof consisting of ammonium salts and amine salts thereof; (meth)acrylate ester-(alkoxy)polyethylene glycol(meth)acrylate copolymers, styrene-(meth)acrylate ester-(alkoxy)polyethylene glycol(meth)acrylate ester copolymers, and styrene-(alkoxy)polyethylene glycol(meth)acrylate ester copolymers; methylcellulose, hydroxyethylcellulose, hydroxypropylcellulose, cellulose acetate phthalate, vinyl alcohol-vinyl acetate copolymer, and vinyl alcohol-ethylene copolymer; hydrophilic polyurethanes and hydrophilic polyesters; and ethylene oxide-($C_3$,$C_4$)alkylene oxide copolymers.

(9) A process as described above under (3), wherein the perforated mask is formed of a plastic film of a material selected from the group consisting of polyesters, nylons, vinyl alcohol copolymers, polyvinyl butyral, polyimides, polyamide-imides, cellulose acetate, polyethylene, and polypropylene.

(10) A process as described above under (3), wherein the perforated mask contains at least one of a thermal energy absorbing component and a self-burning resin component.

(11) A process as described above under (10), wherein the thermal energy absorbing component is at least one of carbon black and an infrared absorbing compound.

(12) A process as described above under (10), wherein the self-burning resin component is nitrocellulose.

(13) A process as described above under (1), wherein the central impression cylinder press is of a type that makes use of a printing method selected from the group consisting of flexographic printing, gravure printing and offset printing all of which employ a machine plate having the pixel pattern.

(14) A process as claimed in claim 1, wherein the central impression cylinder press is of a type that makes use of a printing method selected from the group consisting of liquid inkjet printing, dispenser injection printing, pasting-needle ink dropping printing, electrostatic liquid printing, thermal transfer printing, electrostatic powder printing and solid inkjet printing.

(15) An ink useful in a fabrication process of a CF as described above under any one of (1)-(14), which comprises a colorant and a binder.

(16) An ink as described above under (15), which is an organic-solvent-based ink, water-based ink, solventless ink, or hot-melt solid ink.

(17) An ink as described above under (15), wherein the colorant is a pigment.

(18) An ink as described above under (17), wherein the pigment is a pigment useful for the formation of red (R), green (G) or blue (B) pixels, and is selected from the group consisting of red pigments consisting of C.I. Pigment Reds 9, 97, 168, 177, 216, 224, 226, 242 and 254, green pigments consisting of C.I. Pigment Greens 7 and 36, blue pigments consisting of C.I. Pigment Blues 15:6 and 60, violet (V) pigments consisting of C.I. Pigment Violet 23 and subphthalocyanine, yellow (Y) pigments consisting of C.I. Pigment Yellows 20, 24, 83, 93, 109, 110, 113, 114, 117, 125, 138, 139, 150, 154, 180 and 185, coprecipitated pigments between the red pigments and the yellow pigments, coprecipitated pigments between the green pigments and the yellow pigments, and solid-solution pigments and mixed-crystal pigments thereof.

(19) An ink as described above under (17), wherein the pigment is a pigment useful for the formation of yellow (Y), magenta (M) or cyan (C) pixels, and is selected from the group consisting of yellow pigments consisting of C.I. Pigment Yellows 62, 74, 93, 128, 155 and 185, magenta pigments which consist of red pigments consisting of C.I. Pigment Red 122 and 146 and a violet pigment consisting of C.I. Pigment Violet 19, a cyan pigment consisting of C.I. Pigment Blue 15:3, coprecipitated pigments between the yellow pigments and the cyan pigment, coprecipitated pigments between the red pigments and the violet pigment, coprecipitated pigments between the cyan pigment and the yellow pigments, and solid-solution pigments and mixed-crystal pigments thereof.

(20) An ink as described above under (17), wherein the pigment is a wet filter cake of the pigment in a finely-divided form as obtained by kneading and grinding the pigment in a form of coarse particles together with a water-soluble salt and a water-soluble organic solvent in a kneader to reduce an average particle size of the pigment to from 10 to 130 nm and then washing and filtering the thus-obtained finely-ground pigment aggregates.

(21) An ink as described above under (17), wherein the pigment is a finely-ground powder pigment obtained by drying and grinding a wet filter cake of the pigment.

(22) An ink as described above under (17), wherein the pigment is a processed pigment obtained by mixing and coprecipitating a wet filter cake of the pigment together with a readily-dispersible polymer.

(23) An ink as described above under (17), wherein the pigment is a processed pigment obtained by kneading finely-divided powder of the pigment together with a readily-dispersible polymer.

(24) An ink as described above under (17), wherein the binder is a film-forming substance selected from the group consisting of random, block and graft copolymers which may contain reactive groups, hydrophobic groups and/or hydrophilic groups; oligomers which may contain reactive groups, hydrophobic groups and/or hydrophilic groups; and monomers, oligomers and/or polymers containing addition-polymerizable, unsaturated double bonds or addition-condensable epoxy groups.

(25) An ink as described above under (17), wherein the pigment has an average particle size of from 10 to 130 nm.

(26) ACF fabricated by a process as described above under any one of (1)-(14).

(27) An image display comprising a CF as described above under (26).

(28) Communication equipment comprising an image display as described above under (27).

The term "flexible plastic film" or "transfer or adhesion plastic film" may hereinafter be called "CF film", the term "glass-made CF substrate" or "plastic-made CF substrate" may hereinafter be called "CF substrate", and the term "transfer or adhesion plastic film" may hereinafter be called "transfer or adhesion film". The three primary colors consisting of red, green and blue or the three primary colors consisting of yellow, magenta and cyan may hereinafter be abbreviated as "R", "G", "B", "Y", "M" and "C", respectively, and RGB pixels or YMC pixels may hereinafter be collectively called "CF pixels", "pixel pattern" or simply "pixels". Further, the term "black matrix" may hereinafter be abbreviated as "BM".

As pixel patterns of the three RGB primary colors or pixel patterns of the three YMC primary colors, known pixel patterns are used including stripe patterns suited for the display of information such as characters and graphics and mosaic patterns and triangle patterns suited for the display of image patterns.

The present invention can fabricate a CF by using a CF film as is or after fixing a perforated mask, which is in a positive-negative relationship with a pixel pattern for the CF, beforehand on the CF film, printing the pixel pattern in three colors on the CF film with pixel-forming inks by a center impression cylinder press directly or via the perforated mask if any, and, when the mask was used, removing the mask after the printing; or, when a transfer or adhesion film was used, by transferring or adhering the pixel pattern from the film to a CF substrate.

For the reasons to be described hereinafter, the process according to the present invention can form a pixel pattern with good accuracy although the printing process is relied upon. Pixels of three primary colors are continuously printed on a "CF film" while the CF film is kept impressed against a central impression cylinder of a central impression cylinder press and is also travelling around together with the central impression cylinder. A pixel pattern is, therefore, printed with good accuracy. When a perforated mask is formed on a CF film, the perforations for the pixels of the three primary color can be formed with good accuracy by a single, concurrent operation rather than their color-by-color formation. In addition, the mask is held in place on the film. Accordingly, the pixel pattern is formed with extremely high accuracy, and the resultant CF shows excellent performance in image characteristics such as pixel fineness and definition.

The present invention will next be discussed from the standpoint of economical advantages. The conventional fabrication of CFs relies upon the application of organic-solvent-based color resists, that is, the photolithographic process, and therefore, requires numerous and long fabrication steps. Accordingly, the conventional fabrication process requires enormous initial investment and moreover, a high running cost. In contrast, the fabrication process according to the present invention is basically a printing process, requires relatively low initial investment, includes short fabrication steps, permits rationalization, needs a low running cost, is economical, and can provide CFs at low cost.

Especially when water-based inks are used as inks, wet filter cakes of finely-divided pigments can be used as colorants for the inks. These inks can form pixels excellent in optical characteristics such as vividness, color purity, optical density, transmission and contrast, and moreover, do not require much initial investment for the maintenance of sanitation in the working environment and the safety against fire hazards. Coupled with the advantages available from the rationalized fabrication steps, the present invention can bring about significant economical advantages.

Keeping in step with the recent move toward larger image displays such as color displays and color television sets, there is an increasing move toward larger CFs as mentioned above. The fabrication process according to the present invention, which makes use of the center impression printing process, can provide CFs which facilitate the manufacture of larger color displays without needing large investment.

BEST MODE FOR CARRYING OUT THE INVENTION

Figure 1:
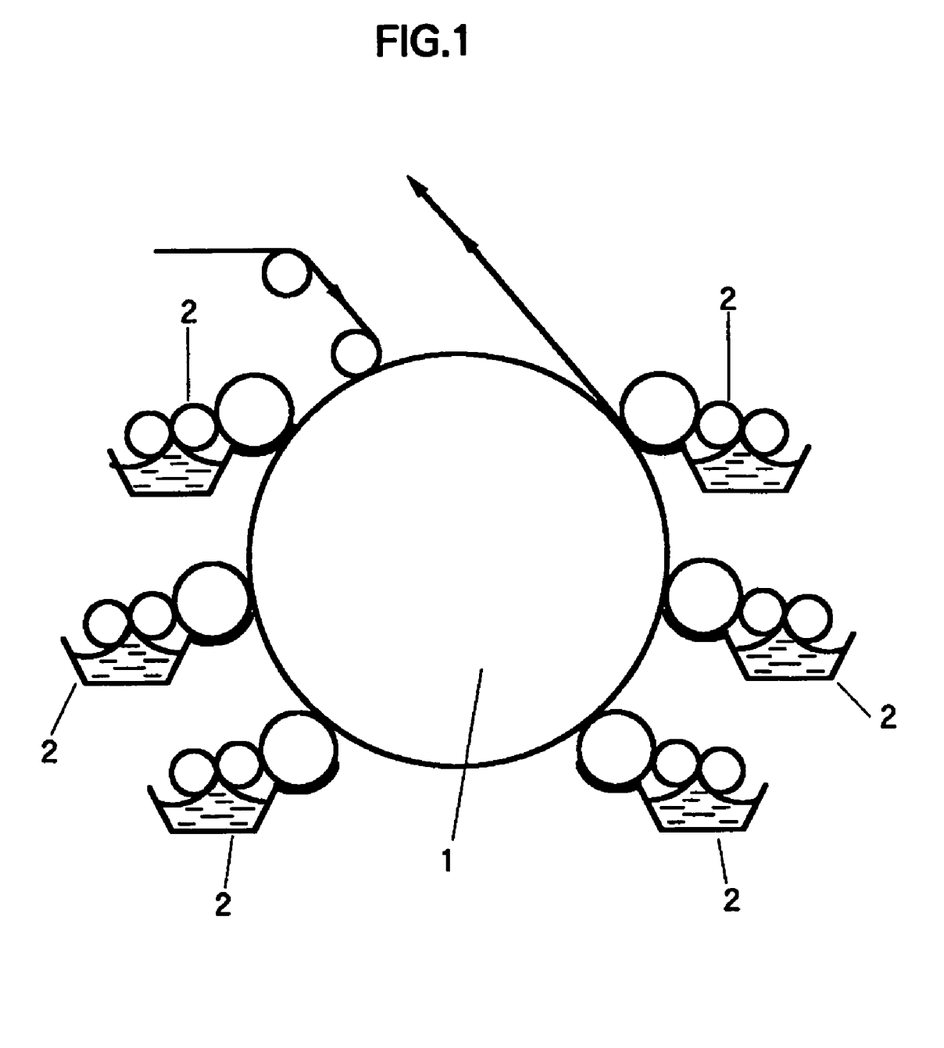
FIG. 1 a schematic illustration showing the basic construction of a center impression cylinder press useful for practicing the fabrication process of the present invention.

The present invention will hereinafter be described in detail. A description will hereinafter be made about a process for fabricating a CF by printing pixels of three primary colors with a center impression cylinder press. Merits of the center impression cylinder press, which characterizes the present invention, will be described. With reference to FIG. 1, a center impression cylinder press for flexographic printing will be described as an example. Printer units, for example, 3 to 10 printer units 2 are arranged like satellites, in other words, in the form of satellites around a central impression cylinder 1.

A plastic film to be printed by the printing press can have, for example, a maximum width of from 250 mm to 1,550 mm and a maximum effective printing width of from 230 mm to 1,520 mm, although they vary depending upon the design of the printing press. A film, as a web to be printed, is fed from a supply station, is caused to wrap the central impression cylinder the temperature of which is controlled, and is allowed to travel at a speed conforming with the rotation of the central impression cylinder. Therefore, the tensile force, in other words, the tension applied to the film during the printing does not vary so that the film scarcely undergoes stretching/shrinkage or slacking between the respective printer units. The film is printed with inks from the individual printer units arranged like satellites around and on an outer side of the central impression cylinder. The printed film is introduced into a drying station, dried there, and then taken up at a take-up station. Even with a thin film, the registration accuracy is therefore excellent so that individual pixels formed on the film to make up a pixel pattern can be printed with mutual misalignments. This feature is very preferred.

A description will next e made about the number of printer units arranged around the central impression cylinder. To avoid uneven printing of the pixel pattern, it is preferred to repeatedly print the same color by using two or more color units per color. Preferred is, for example, a central impression cylinder press in which 6 or more printer units are arranged like satellites to permit the printing of a pixel pattern of the three RGB primary colors or the three YMC primary colors. For an increased color density, it is also possible to use 7 to 10 printer units for three colors and to perform printing three times or more per color.

As a printing method to be performed by the central impression cylinder press, one of conventionally-known many printing methods can be performed by the printer units. There are, for example, (1) printing methods each of which employs a machine plate having a pixel pattern, such as flexographic printing, gravure printing and offset printing; and (2) printing methods each of which ejects or transfers a pixel pattern, for example, plateless printing methods (printing methods each of which does not use any machine plate) such as liquid inkjet printing, dispenser injection printing, pasting-needle ink dropping printing, electrostatic liquid printing, thermal transfer printing, electrostatic powder printing and solid inkjet printing.

As the printing method requiring the arrangement of a machine plate, flexographic printing is particularly preferred. As each flexographic printer unit, it is preferred that its anilox roller is a ceramic sleeve anilox roller, its line density is from 300 to 2,500 lines/inch, preferably from 400 to 1,000 lines/inch, its line depth is from 1 to 20 μm, preferably from 2 to 10 μm, and its machine plate is an endless-sleeve-type, resin-made seamless machine plate having a line density of from 100 to 800 lines/inch, preferably from 100 to 300 lines/inch. As each color station, it is preferred to arrange a color station of the completely-sealed type that the color station is sealed at both sides thereof, is provided with two doctor blades in an up-and-down relationship, and performs the feed-in and feed-out of an ink in a bored ink doctor chamber. For the above-described manner of arrangement of the printer units, printing is performed by the wet-on-wet method. The printing pressure may preferably be controlled at such a low pressure (kiss touch) that no marginal zone is formed. As a drying method, hot-air drying, heat drying, UV curing, electron beam curing, gas drying or the like can be used.

To fabricate LC color displays on-line or off-line in continuation with the above-described printing by the central impression cylinder press, the central impression cylinder press can be connected to various processing machines such as coating applicators for overcoat layers and transparent electrode layers, a laminator for polarizing films, and a cutting machine. The formation of each transparent electrode layer is conducted with an ink in which a known inorganic, conductive, fine-particulate material such as tin oxide, indium oxide, antimony oxide or indium tin oxide is finely dispersed as a conductive material. In the case of the above-described transfer or adhesion process (2), the central impression cylinder press can be connected to an adhesion processing machine or transfer processing machine for adhering or transferring each pixel pattern onto a glass-made CF substrate or plastic-made CF substrate so that the processing can be performed continuously.

The fabrication of a CF by printing in the present invention can be practiced in one of two ways, one being to directly print a pixel pattern of the three primary colors, and the other being either to transfer a pixel pattern of the three primary colors from a film, on which the pixel pattern of the three primary colors has been printed beforehand, onto a CF substrate or to adhere the film with the pixel pattern of the three primary colors printed thereon. Any plastic film can be used as a CF film upon conducting the printing insofar as it has flexibility sufficient to follow the rotation of the central impression cylinder press and also remains unstretched during the course of its transportation through the printing press such as its feed-out, changes of its traveling course, and its take-up. As the film, a known film can be used such as a polyester film, polypropylene film or composite film. The thickness of the film can be from 10 to 300 μm, preferably from 12 to 150 μm, although it varies depending upon the kind and processing of the film When the printing of a pixel pattern of still higher accuracy is needed, it is possible to use a perforated mask which is in a positive-negative relationship with the arrangement pattern of RGB pixels or YMC pixels. This mask can be prepared, for example, by one of the following methods:

(1) After a film-forming material is coated on a CF film to form a mask film (A) or a mask-forming film (B) is adhered on the CF film, the mask film (A) or mask-forming film (B) is subjected to laser abrasion to form pores in the negative-positive relationship with the pixel pattern.

(2) A pattern of perforations is printed on a CF film by a printing method or the like, and at areas other than those corresponding to the pixel pattern, a film is formed to form the mask.

(3) A mask-forming film (B) is subjected to laser abrasion to form perforations in the negative-positive relationship with the pixel pattern, and the thus-perforated film is adhered on a CF film.

The thickness of the above-described mask is generally from 1 to 10 μm, although it is determined corresponding to the thickness of pixels to be formed.

A description will next be made about the method for printing (forming) a pixel pattern through the above-described perforated mask. The use of a central impression cylinder press is preferred when it is desired to reproduce positional registration with still better accuracy upon printing a pixel pattern. By the above-described method that printing is performed by using a machine plate, the perforated mask which has become unnecessary after the printing is stripped off. A pixel pattern to be formed on a CF film can, therefore, be formed with good accuracy at the positions of the perforations even if the printing accuracy of the pattern is insufficient when pixels are successively printed on a mask. Further, when a machine plate is formed in such a way that each ink-depositing area on the machine plate is set slightly greater than its corresponding perforation, a printing defect which tends to occur when an ordinary mask is not used, such as a thick ink layer or conversely, a thin ink layer at an edge part of each pixel or bleeding takes place on the mask on the outer side of the perforation. The mask which has become unnecessary after the printing is, therefore, peeled off so that the above-described defect is eliminated. According to the printing method that each ink is injected directly into its corresponding perforations, the injection of an adequate amount of the ink into each of its corresponding perforations makes it possible to form a pixel pattern with high accuracy. Similarly to the foregoing, each ink extended out of the perforations is stripped off together with the mask which has become unnecessary after the printing.

The material which forms the mask film (A) is required to remain undissolved or unswollen with inks or the like to be used subsequently and also to remain undissolved with a stripper to be used upon removing a mask which has become unnecessary subsequent to the printing of pixels. As the stripper for the mask, the use of water or a mixed solvent of water and a lower alcohol (carbon number: 1 to 3) is preferred in view of safety, economy and the like. As examples of a material for forming a mask film, hydrophilic high-molecular materials can be mentioned. Among such hydrophilic high-molecular materials, preferred are polymers which contain carboxyl groups and can be removed with an aqueous alkaline solution.

Examples of the above-described copolymers include known polymers such as (meth)acrylate ester-(meth)acrylic acid copolymers, styrene-(meth)acrylate ester-(meth)acrylic acid copolymers, styrene-(meth)acrylic acid copolymer, ethylene-vinyl acetate-(meth)acrylic acid copolymer, ethylene-(meth)acrylate ester-(meth)acrylic acid copolymers, and soluble salts thereof consisting of ammonium salts and amine salts thereof; (meth)acrylate ester-(alkoxy) polyethylene glycol(meth)acrylate copolymers, styrene-(meth)acrylate ester-(alkoxy)polyethylene glycol(meth)acrylate ester copolymers, and styrene-(alkoxy)polyethylene glycol(meth) acrylate ester copolymers; methylcellulose, hydroxyethylcellulose, hydroxypropylcellulose, cellulose acetate phthalate, and the like; vinyl alcohol-vinyl acetate copolymer, vinyl alcohol-ethylene copolymer, and the like; hydrophilic polyurethanes, hydrophilic polyesters, and the like; and ethyleneoxide-($C_3$,$C_4$)alkyleneoxide copolymers, and the like. These polymers area each use in the form of a solution in an organic solvent or a solution in water.

As the mask-forming film (B), a film material which is neither dissolved in nor swollen by the ink to be used subsequently is used. Known film materials, for example, polyesters, nylons, vinyl alcohol copolymers, polyvinyl butyral, polyimides, polyamide-imides, cellulose acetate, polyethylene, and polypropylene can be used.

In the case of the mask-forming film (B), its adhesion to a CF film is needed. The mask-forming film (B) needs adhesion strength of such a degree as merely holding the resulting mask in place during printing, so that a known bonding method can be used for the adhesion. As the mask-forming film (B) has to be stripped off subsequent to the printing (formation) of a pixel pattern, it is preferred to adhere the mask-forming film (B) by applying a readily-separable adhesive to a CF film upon adhesion of the mask-forming film (B).

When it is desired to conduct laser abrasion with low energy for the fabrication of a mask, the inclusion of a thermal energy absorbing component and/or a self-burning resin component in the mask-forming film is preferred. As the thermal energy absorbing component, an infrared absorbing compound such as carbon black or a cyanine compound can be mentioned. As the self-burning resin component, on the other hand, nitrocellulose known to be useful in paints and inks is preferred.

The size of perforations in a mask is determined by a pixel pattern designed in accordance with the application of the CF, and no particular limitation is imposed thereon. For example, the major axis can be approximately from 30 to 500 μm, the minor axis can be approximately from 10 to 200 μm, and the film thickness can be approximately from 0.2 to 5 μm.

A description will next be made about materials usable in the inks employed in the present invention. The components of these inks include colorants, a binder, and a polymer-based dispersion aid, pigment dispersant and liquid medium all of which can be added as needed. As the colorants, pigments are particularly preferred for their excellent fastness such as heat resistance, light fastness and solvent resistance. Upon preparing an ink by using a pigment, a binder, a binder dispersant and a liquid dispersion medium are used. Depending upon the kind or existence/non-existence of the liquid dispersion medium, each ink is classified as an organic-solvent-based ink, a water-based ink, an addition-polymerizable or an addition-crosslinkable (or sol-ventless) ink, or a hot-melt solid ink.

A description will next be made about the colorants contained in the inks for RGB pixels and also in those for YMC pixels. Organic pigments, dyes, inorganic pigments and the like, which have been used as colorants for RGB pixels or YMC pixels of conventional CFs, can be used likewise. As pigments, for example, conventionally-known pigments can be used including azo pigments such as insoluble azo pigments, soluble azo pigments and high molecular weight azo pigments, quinacridone pigments such as quinacridone red pigments and quinacridone magenta pigments, anthraquinone pigments, perylene pigments, phthalocyanine pigments such as phthalocyanine blue pigments and phthalocyanine green pigments, isoindolinone pigments, dioxazine pigments such as dioxazine violet, quinophthalone yellow pigment, and nickel azo yellow pigment. As black pigments for use in the formation of BMs by a printing method, conventionally-known black pigments can be used including carbon black pigment, composite oxide black pigments, iron oxide black pigment, titanium oxide black pigments, azomethineazo black pigments, and perylene black pigments.

As dispersible dyes, oil-soluble dyes and water-soluble dyes, dyes which are known conventionally as RGB colors or YMC colors can be used either singly or in combination with pigments. Dyes are inferior in various fastness to pigments, but are excellent in optical characteristics such as tone vividness and brightness, light transmission and contrast. Pigments and various dyes can, therefore, be used by making good use of their merits.

As a CF for use in a color LCD, it is necessary as a image display member to radiate colors that are visible to man. The emission wavelengths corresponding to RGB in the energy distribution of a three-wavelength fluorescent lamp employed as an exemplary backlight light source are 610 nm, 540 nm, and 430 to 480 nm, respectively. As tones of colorants to be used, it is preferred to be in conformity with the colors of the above-described emission wavelengths and the color of a preferred wavelength in the above-described emission wavelength range, respectively, for example, 610 nm for red pixels, 540 nm for green pixels, and 460 nm for blue pixels. Employed as colorants for the formation of CF pixels are, therefore, colorants, especially pigments which have high transmittances at the wavelengths of their corresponding colors and are excellent in physical properties.

Numerous pigments can be mentioned as the above-described RGB-forming pigments. Representative specific examples of these pigments include, as red pigments, C.I. Pigment Reds (hereinafter abbreviated as "PRs") 9, 97, 168, 177, 216, 224, 226, 242 and 254; as green pigments, C.I. Pigment Greens (hereinafter abbreviated as "PGs") 7 and 36; as blue pigments, C.I. Pigment Blues (hereinafter abbreviated as "PBs") 15:6 and 60; as violet (V) pigments, C.I. Pigment Violet (hereinafter abbreviated as "PVs") 23 and subphthalocyanine; and as yellow (Y) pigments, C.I. Pigment Yellows (hereinafter abbreviated as "PYs") 20, 24, 83, 93, 109, 110, 113, 114, 117, 125, 138, 139, 150, 154, 180 and 185). Also included are coprecipitated pigments between the red pigments and the yellow pigments, coprecipitated pigments between the green pigments and the yellow pigments, and solid-solution pigments and mixed-crystal pigments thereof.

Representative specific examples of pigments useful for the formation of YMC pixels include, as yellow pigments, PYs 62, 74, 93, 128, 155 and 185; as magenta pigments, PRs 122 and 146 and PV 19; and as a cyan pigment, PB 15:3. Also included are coprecipitated pigments between the yellow pigments and the cyan pigment, coprecipitated pigments between the magenta pigments and the violet pigment, coprecipitated pigments between the cyan pigment and the yellow pigments, and solid-solution pigments and mixed-crystal pigments thereof. Representative specific examples of the above-described black pigments useful for the formation of BMs include C.I. Pigment Blacks (hereinafter called "PBKs") 6, 7, 11 and 26.

Pigments preferred for use in the present invention are pigments in the form of fine particles. In the present invention, pigments which can be subjected to a finely grinding step for pigments will all be called "coarse particulate pigments" even if they are powdery coarse pigments produced through a pigment synthesis step and pigment-forming step or powdery pigments usable as colorants in conventional paints and synthetic resins. Usable as a finely-divided pigment is a wet filter cake of the pigment in a finely-divided form as obtained by kneading and grinding the pigment in the form of coarse particles together with a powdery water-soluble salt and a water-soluble organic solvent, the boiling point of which is preferably 150° C. or higher, in a kneader to reduce the average particle size of the pigment to from 10 to 130 nm, preferably from 20 to 110 nm and then washing and filtering the thus-obtained finely-ground pigment aggregates; a finely-ground powder pigment obtained by drying and grinding the wet filter cake of the pigment; or a processed pigment obtained by coprecipitating or kneading the wet filter cake of the pigment together with a readily-dispersible polymer.

An aqueous pigment dispersion can be obtained by dispersing the wet filter cake of the finely-divided pigment—which has been obtained as described above—or the processed pigment—which has been obtained by coprecipitating or kneading the wet filter cake together with a readily-dispersible polymer as described above—together with an aqueous dispersant of a polymer, which contains pigment-compatible groups and/or pigment-compatible molecular chains as hydrophobic segments, without making combined use of a pigment dispersion aid which is an anionic or cationic derivative of the pigment. This aqueous pigment dispersion can be provided as a water-based pigment ink for CFs as is or after adding a binder as needed. Use of this water-based pigment ink makes it possible to obtain a pigment pattern excellent in optical characteristics such as vividness, color purity, optical density, transmission and contrast. As will be described subsequently herein, the above-described aqueous polymer dispersion is considered to deposit on the surfaces of the pigment owing to the hydrophobic effect of the pigment-compatible, hydrophobic segments, and hence, to stabilize the fine dispersion of the pigment.

A description will next be made about the binder. Where an ink is a drying set ink, a conventionally-known drying set binder is used as the binder. This binder is a film-forming polymer employed in the form of a solvent solution, an aqueous solution, an emulsion, a latex or a solid, heat-fusible resin. This film-forming polymer is a random, block and/or graft copolymer which may or may not contain reactive groups. The binder may additionally contain a crosslinking agent as needed.

As a binder usable where an ink is a polymerizing ink, an addition-polymerizable or addition-crosslinkable binder can be mentioned. This addition-polymerizable or addition-crosslinkable binder comprises a conventionally-known monomer, oligomer and/or polymer, which contains one or more unsaturated double bonds or polymerizable cyclic ether groups having addition-polymerizability or addition-crosslinkability, in combination with a polymerization initiator and a liquid medium both of which are added as needed. As addition-polymerizable or addition-crosslinkable inks, heat- or radiation-curing inks can be mentioned including heat-polymerizing inks, laser-beam polymerizing inks, UV-polymerizing inks, photocation-polymerizing inks and electron-beam-polymerizing inks.

A high-molecular colorant dispersant is a random, block and/or graft copolymer containing colorant-compatible groups and/or colorant-compatible molecular chains and solvent-compatible groups and/or solvent-compatible molecular chains in its molecule. The above-described dispersants, each of which has plural functions such as colorant dispersing ability and colorant fixing ability by itself, are also usable. Although the amount of a colorant to be used in an ink cannot be determined in a wholesale manner, it is desired to use a colorant in an amount sufficient to provide a satisfactory chroma and developed color density and also to provide a satisfactory ink viscosity and storage stability. When a pigment is used as a colorant, the amount of the pigment to be used is from 2 to 30 wt. %, preferably from 5 to 25 wt. % based on the whole ink composition.

A description will next be made about preferred monomers for the formation of the above-described binders or high molecular dispersants. A hydrophobic group contained in a monomer acts as a solvent-compatible group in an organic-solvent-based ink or as a pigment-compatible group in a water-based ink. Examples of such monomers include aromatic vinyl monomers such as styrene, α-methylstyrene and vinylnaphthalene; $(C_{1-30})$alkyl esters, $(C_{4-20})$cycloalkyl esters and $(C_{6-20})$alkylcycloalkyl esters of α,β-ethylenically unsaturated carboxylic acids such as acrylic acid and methacrylic acid; and alkylenes such as ethylene, propylene, butylene, isobutylene, butadiene and isoprene. As macromonomers containing hydrophobic molecular chains, macromonomers each of which contains α,β-ethylenically unsaturated groups bonded on a homo- or co-polymer chain of one of the above-described, hydrophobic-group-containing monomers can be mentioned. Examples of the monomers each of which contains one or more polymerizable cyclic ether groups include epoxy compounds, oxetane compounds and the like.

Into a binder for use in water-based inks, hydrophilic groups and/or hydrophilic molecular chains are introduced. There are, as examples of monomers with one or more anionic hydrophilic groups contained therein, the above-described α,β-ethylenically unsaturated carboxylic acids, vinylsulfonic acid and styrenesulfonic acid; as examples of comonomers with one or more nonionic hydrophilic groups contained therein, 2-hydroxyethyl(meth)acrylate, hydroxypropyl(meth)acrylate, 2,3-dihydroxypropyl(meth)acrylate, polyethylene glycol(meth)acrylate, methoxypolyethylene glycol(meth)acrylate, ethoxypolyethylene glycol(meth)acrylate, polyethylene glycol-polypropylene glycol mono (meth)acrylate, butoxy(polyethylene glycol-polypropylene glycol)methacrylate, and (meth)acrylamide; and as examples of comonomers with one or more cationic hydrophilic groups contained therein, N,N-dimethylaminomethyl (meth)acrylate, N,N-diethylaminomethyl(meth)acrylate, and 4-vinylpyridine. As examples of macromonomers with hydrophilic molecular chains contained therein, there are macromonomers with α,β-ethylenically unsaturated groups bonded on homo- or co-polymers of the above-described, hydrophobic-group-containing monomers or on copolymers between hydrophilic-group-containing monomers and the above-described hydrophobic-containing monomers.

Examples of monomers, each of which contains one or more groups reactive to a crosslinking agent, include carboxyl-containing monomers such as (meth)acrylic acid and maleic acid; hydroxyl-containing monomers such as 2-hydroxy$(C_{2-6})$alkyl(meth)acrylates and polyethylene glycol (meth)acrylate; epoxy-containing monomers such as glycidyl(meth)acrylate; methylol-containing monomers such as N-methylol(meth)acrylamide and N-methoxymethyl(meth) acrylamide; silanyl-containing monomers such as γ-methacryloxypropyltrimethoxysilane; isocyanato-containing monomers such as isocyanatoethyl(meth)acrylate and 2-isocyanato-2-(p-isopropenylphenyl)propane. Examples of macromonomers, each of which contains groups reactive to a crosslinking agent, include macromonomers with α,β-ethylenically unsaturated groups bonded on homo- or co-polymers of monomers containing one or more groups reactive to the crosslinking agent or on copolymers between the reactive-group-containing monomers and the above-described hydrophobic-containing monomers.

Examples of the crosslinking agent include epoxy-containing crosslinking agents such as trimethylolpropane polyglycidyl ether and pentaerythritol polyglycidyl ether; methylol-containing crosslinking agents such as methoxymethylol melamine and butoxymethylol melamine; carbodiimido-containing crosslinking agents such as a multi-branched polycarbodiimide as a urethane reaction product between polyhexamethylenecarbodiimide and bis (monomethoxypolyethylene glycol and polyoxyethylene sorbitolmonolurate); and isocyanato-containing crosslinking agents such as phenol-masked isocyanates of a trimethylol-propane-tris(tolylene diisocyanate) adduct and trimethylol-propane-tris(hexamethylene diisocyanate) adduct.

Examples of dispersion media usable for inks include, as organic solvent media usable in oil-based inks, ($C_{1-10}$) alcohols; ($C_{2-6}$)alkylene glycols; ($C_{2-6}$)polyalkylene glycols; mono($C_{1-10}$)alkyl ethers, di($C_{1-10}$)alkyl ethers and mono($C_{1-10}$)alkyl ether monoacylates of these glycols; ($C_{1-6}$)alkyl esters of ($C_{1-6}$)organic acids; ketones such as methyl ethyl ketone, methyl isobutyl ketone and cyclohexanone; aliphatic hydrocarbon solvents such as ($C_{6-10}$)alkane hydrocarbons, "ISOPAR" (trademark; product of Exxon Chemical Japan Ltd.) and "SHELL SOL" (trade mark, product of Shell Japan Ltd.); aromatic ($C_{7-10}$)hydrocarbon solvents; and nitrogen-containing solvents such as N-methyl-2-pyrrolidone, 2-pyrrolidone, and 1,3-dimethyl-2-imidazolidinone.

An aqueous medium for use in water-based inks is water or a mixed solvent of water and a water-soluble organic solvent. As water, it is preferred to use deionized water, distilled water, or the like. As water-soluble organic solvents usable in mixed aqueous solvents, conventionally-known water-soluble organic solvents can be mentioned. Illustrative are ($C_{1-3}$)alcohols; ($C_{2,3}$)glycols; glycerins; lower alkyl ethers of polyhydric alcohols, such as ($C_{2,3}$)alkylene glycol ($C_{1-4}$)alkyl ethers and ($C_{2,3}$)polyalkylene glycols($C_{1-4}$)alkyl ethers; and nitrogen-containing solvents such as N-methyl-2-pyrrolidone and 2-pyrrolidone.

A description will next be made about the radiation-assisted addition-polymerizable or addition-crosslinkable inks such as heat-polymerizing inks, UV-curing inks and electron-beam-curing inks. These conventionally-known, radiation-curing inks such as UV-curing inks, photocation-polymerizing inks and electron-beam-curing inks are curing inks, each of which comprises a colorant, a colorant dispersant, and a binder precursor capable of undergoing a curing reaction and formed of an addition-polymerizable monomer, addition-polymerizable oligomer and/or addition-crosslinkable polymer with one or more $\alpha,\beta$-ethylenically unsaturated bonds or epoxy groups contained therein, a conventionally-known initiator added according to the type of the curing system, and other additives and a diluent solvent both of which are added as needed.

In the case of a heat-polymerizing, UV-curing or electron-beam-curing ink making use of a pigment, the pigment (10 to 20 wt. %), an addition-polymerizable monomer (20 to 50 wt. %), an addition-polymerizable oligomer or a soluble resin (10 to 40 wt. %), a polymerization initiator (3 to 10 wt. %) if employed, and if necessary, other additives and a diluent solvent can be mixed together into the ink, for example. Examples of usable addition-polymerizable oligomers and polyfunctional monomers include urethane acrylates such as (polytetramethylene glycol-hexamethylene diisocyanate polyurethane)bisacrylate; acrylic oligomers such as polyester acrylates, e.g., poly(hexylene isophthalate)-bisacrylate and (trimethylolpropane-adipic acid polyester)-polyacrylate; and polyacrylates such as tetraethylene glycol diacrylate, tripropylene glycol diacrylate, tricyclodecanedimethanol diacrylate, the diacrylate of a bisphenol A-ethylene oxide adduct, trimethylolpropane triacrylate, pentaerythritol triacrylate, pentaerythritol tetraacrylate, and dipentaerythritol hexaacrylate.

A photocation-polymerizing pigment ink contains a pigment (10 to 20 wt. %), an alicyclic diepoxy compound (40 to 60 wt. %), an oxetane compound (5 to 20 wt. %), a polymerization initiator and sensitizer (2 to 5 wt. %), and if necessary, other additives and a diluent solvent. Examples of the alicyclic diepoxy compound include 3,4-epoxycyclohexylmethyl (3,4-epoxy)cyclohexanecarboxylate and limonene dioxide. Examples of the oxetane compound include oxetane alcohol, dioxetane, phenyloxetane, xylylenedioxetane, and 2-ethylhexyloxetane.

As the polymerization initiators for use in the above-described radiation-polymerizing inks, conventionally-known initiators can be employed. Preferred examples include, as heat-polymerization initiators, azobisisobutyronitrile, azobiscyanoisovalelic acid and dimethyl 2,2'-azobisisobutyrate; as photopolymerization initiators, benzyl ketal, $\alpha$-hydroxyacetophenone and $\alpha$-aminoacetophenone; as photocation polymerization initiators, triarylsulfonium salts and aryliodonium salt; and as a sensitizer, 1-chloro-4-propoxythioxanthone.

As a pigment disperser for use in the production of pigment inks according to the present invention, a conventionally-known disperser, for example, an upright, medium-containing disperser such as a ball mill, sand mill or beads mill, a horizontal, medium containing disperser such as "DYNOMIL" (trade mark, manufactured by Shinmaru Enterprises Corporation) or horizontal beads mill, a roll mill, an ultrasonic mill, a high-pressure impact disperser, or the like can be used. A pigment can be dispersed by subjecting it to dispersion processing a plurality of times by using one of the above-exemplified dispersers or by performing its dispersion while using two or more dispersers in combination. In the present invention, the desired dispersion particle size of each pigment can be from 10 to 130 nm, preferably from 20 to 110 nm, more preferably 100 nm or smaller substantially without particles of 150 nm and greater, all in terms of average particle size. As a method for obtaining a dispersion of a pigment with a desired particle size distribution, a variety of measures can be adopted such as to reduce the size of grinding media in the disperser, to increase the packing rate of a grinding medium, to make the processing time longer, to make the delivery rate slower, or to classify and separate the pigment by a filter, ultracentrifuge or the like after the grinding. Further, these methods can also be combined.

EXAMPLES

The present invention will next be described in more detail based on specific examples. It should, however, be bone in mind that all the designations "part" or "part" and "%" in the following examples are on a weight basis.

Example 1

(a) Finely-dividing Processing of Pigments

PR254, PG36, PY138, PY139, PB15-6 and PV23 were provided as pigments, and by the below-described procedure, were successively subjected to finely-dividing processing. With respect to each pigment, the pigment (100 parts) was charged together with sodium chloride powder (400 parts) and diethylene glycol (130 parts) into a kneader which was equipped with a pressure lid. They were premixed until evenly wet aggregates are formed in the kneader. The pressure lid was then closed, and then, kneading and grinding were initiated while holding the contents under a pressure of 6 kg/cm$^2$.

Kneading and grinding processing was conducted for 7 hours while controlling the temperature and flow rate of the coolant water such that the contents were maintained at 40 to 45° C. The thus-obtained ground mixture was poured into 2% sulfuric acid (3,000 parts) which had been heated to 80° C., followed by stirring for 1 hour. The resulting mixture was then collected by filtration and washed with water to remove sodium chloride and diethylene glycol. Those operations were repeated to obtain press cakes of the individual pigments, i.e., PR254, PG36, PY139, PB15-6 and PV23. With respect to each of the press cakes of the individual pigments, a nonionic surfactant was added in an amount of 200% based on the pigment. The resulting mixture was diluted with water, followed by ultrasonic dispersion to prepare a pigment dispersion. By a particle size measuring instrument, "MODEL N-4" (tradename, manufactured by Coulter Electronics, Inc.), the average particle sizes of the five pigment dispersions prepared as described above were measured. Their average particle sizes were found to fall within a range of from 50 to 80 nm.

(b) Preparation of Pigment Dispersions

Using the materials shown below in Table 1, pigment dispersions of the respective colors were prepared. As the pigments shown in Table 1, the pigment press cakes prepared in the above procedure (a) were used. The pigment contents in the individual pigment press cakes fell within a range of form 35 to 45%. By calculating the water contents in the individual press cakes, the additional deionized water was added to make up for the deficiencies. Specifically, each pigment dispersion was prepared as will be described hereinafter. The materials shown in Table 1 were combined in their corresponding amounts indicated in terms of "parts" in the same table. The resulting mixture was agitated for 2 hours in a dissolver and, after confirming that aggregates of the pigment were no longer contained, the mixture was subjected to dispersion processing at a circumferential speed of 14 m/s in a horizontal, medium-containing disperser "DYNOMIL 1.4-LITER ECM MODEL" (trade name, manufactured by Shinmaru Enterprises Corporation) while using zirconia-made beads (diameter: 0.65 mm). Aqueous Resin-based Pigment Dispersant 1 employed in the preparation was an aqueous solution (solid content: 50%, solution medium: 3:2:1 mixed solvent of water, n-butanol and isopropanol) of a benzyl methacrylate-ethyl methacrylate-(2-ethylhexyl)methacrylate-(2-hydroxyethyl)methacrylate-ammonium methacrylate copolymer(weight ratio: 30:20:20:10: 20, weight average molecular weight: approx. 8,000).

TABLE 1

Kinds and Amounts (parts) of Materials Used for the Preparation of Pigment Dispersions

| Used materials | Red Pigment Dispersion 1 | Green Pigment Dispersion 1 | Yellow Pigment Dispersion 1 | Yellow Pigment Dispersion 2 | Blue Pigment Dispersion 1 | Violet Pigment Dispersion 1 |
|---|---|---|---|---|---|---|
| PR254 | 20 | — | — | — | — | — |
| PG36 | — | 20 | — | — | — | — |
| PY139 | — | — | 20 | — | — | — |
| PY138 | — | — | — | 20 | — | — |
| PB15-6 | — | — | — | — | 20 | — |
| PV23 | — | — | — | — | — | 20 |
| Resin-based Pigment Dispersant 1 | 12 | 12 | 12 | 12 | 12 | 12 |
| Water content (Water content of cake + added deionized water) | 44 | 44 | 44 | 44 | 44 | 44 |
| Total | 76 | 76 | 76 | 76 | 76 | 76 |

By the particle size measuring instrument, "MODEL N-4", the average particle sizes of the thus-obtained pigment dispersions of the individual colors were measured. Their average particle sizes were found to fall within a range of from 40 to 70 nm.

(c) Preparation of Water-based Flexographic Pigment Inks

In accordance with the formulas shown below in Table 2, water-based flexographic RGB pigment inks were prepared, respectively. To meet optical transmission wavelength characteristics required for a CF, the RGB inks were each adjusted in its color tone by adding two kinds of pigment dispersions. Specifically, each water-based flexographic pigment ink was prepared as will be described hereinafter. After the materials were thoroughly agitated, the resulting mixture was filtered through a membrane filter (pore size: 5 μm) to afford a water-based flexographic pigment ink of the corresponding color. By repeating those operations, the water-based flexographic pigment inks of RGB colors were obtained. Film-forming Material 1 employed in the preparation was an emulsion polymerization mixture of a methyl methacrylate-ethyl methacrylate-(2-ethylhexyl)methacrylate-(2-hydroxyethyl)methacrylate-methacrylic acid copolymer (weight ratio: 25:40:20:10:5, solid content: 40%).

TABLE 2

Kinds and Amounts (parts) of Materials Used for the Preparation of Water-based Flexographic Inks

| Used materials | Water-based Flexographic Red Ink 1 | Water-based Flexographic Green Ink 1 | Water-based Flexographic Blue Ink 1 |
|---|---|---|---|
| Red Pigment Dispersion 1 | 62.0 | — | — |
| Green Pigment Dispersion 1 | — | 45.6 | — |
| Yellow Pigment Dispersion 1 | 14.0 | — | — |
| Yellow Pigment Dispersion 2 | — | 30.4 | — |
| Blue Pigment Dispersion 1 | — | — | 66.0 |
| Violet Pigment Dispersion 1 | — | — | 10.0 |
| Film-forming Material 1 | 20.0 | 20.0 | 20.0 |
| Deionized water | 3.0 | 3.0 | 3.0 |
| Defoaming agent (50%) | 1.0 | 1.0 | 1.0 |
| Total | 100.0 | 100.0 | 100.0 |

To test the above-obtained water-based flexographic RGB inks for color tone and various optical characteristics, those inks were separately applied evenly onto polyethylene terephthalate films, and then dried. Each ink showed excellent performance in optical characteristics such as vividness, color purity, optical density, transmission and contrast.

The excellent performance of each of the above-described water-based flexographic pigment inks is considered to be attributable to the following reasons: it was possible to make very small the particle size of the dispersed pigment, because in the step (a), the wet press cake of the finely-divided pigment as obtained by kneading and grinding the pigment in the pressure kneader was used as was and the wet press case was then subjected to dispersion processing in the horizontal, medium-containing disperser to prepare the pigment dispersion; and in the preparation (b) of each pigment dispersion, it was possible to draw out the inherent color tone of each pigment because the water-based flexographic pigment ink does not require any ionic derivative of the pigment which is needed in the case of a solvent-based pigment ink.

(c) Production of Pixel Transfer Film by Flexographic Printing

A central impression (hereinafter abbreviated as "CI-type") flexographic printing press equipped with 6 printer units arranged around a central impression cylinder was used. As printer units for forming a pixel pattern of the three RGB primary colors, two printer units were used per color to perform overprinting such that the resulting print would be provided with improved quality. As resin-made endless machine plates, two resin plates were made for each color by using a pixel pattern of three primary colors arranged in stripe and prepared on a computer screen. On each printer unit, a ceramic anilox roller and the corresponding sleeve-type endless machine plate made as described above were mounted. Each printer unit was set such that the printing would be performed under a low pressure.

The three sets of two printer units were connected to ink reservoirs of Water-based Flexographic R Ink 1, Water-based Flexographic G Ink 1 and Water-based Flexographic B Ink 1 prepared in the above procedure (c), respectively, and the six printer units were individually mounted on their corresponding color stations. Each color station is of the completely-sealed type that the color station is sealed at both sides thereof and is provided with two doctor blades in an up-and-down relationship. As a film to be printed, a polyethylene terephthalate (hereinafter abbreviated as "PET") with polyvinyl alcohol coated as a release layer thereon in advance was provided. The film was fed from a film supply station and was allowed to travel around at a speed conforming with the rotation of the central impression cylinder. As a result, the individual RGB colors were overprinted by the wet-on-wet method. The printed film was introduced into a drying station, dried there, and then taken up at a take-up station. A PET film with a pixel pattern printed on the release layer (hereinafter called "Transfer Film 1") was obtained.

(e) Fabrication of CF by Transfer Process

Using a gravure printing press, a thermosetting acrylic adhesive was then applied over the entire surface of the printed side of Transfer Film 1 obtained as described above. With degassing, the adhesive-coated side of Transfer Film 1 was brought into close contact with a glass-made CF substrate, on which a black matrix had been formed by chromium evaporation, such that the pixel pattern was brought into registration with the black matrix. Heat treatment was then conducted to cure the thermosetting acrylic adhesive. The PET film was then peeled off, and the polyvinyl alcohol of the release layer still sticking on the pixel pattern was dissolved off with pure water. Drying was then conducted to obtain a glass-made CF with the pixel pattern transferred on the glass substrate.

Example 2

(a) Production of Perforated Mask for Pixel Transfer Film

A PET film with a release layer formed thereon was provided in advance by applying an aqueous solution of a polyvinyl alcohol-methylolmelamine (7:3) initial condensation product and baking and curing the initial condensation product. Over the release layer, a 40% solution of t-butyl methacrylate-styrene-methoxypolyethylene glycol methacrylate (50:10:40) copolymer, nitrocellulose and carbon black pigment (5:4:1) in methyl ethyl ketone was evenly applied to give a dry film thickness of approx. 8 μm, so that a self-burning mask film was formed. In accordance with a pixel pattern of a stripe arrangement of the three RGB primary colors formed on a computer screen, the mask film was subjected to laser abrasion by a low-energy laser to obtain a pixel transfer film with a perforated mask formed thereon.

(b) Production of Transfer Film by Flexographic Printing

Following the printing operations of the pixels in the procedure (d) of Example 1, the CI-type flexographic printing press was used. The pixel transfer film with the perforated mask formed thereon as obtained in the above procedure (a) was fed from the film supply station and was allowed to travel around at a speed conforming with the rotation of the central impression cylinder. With Water-based Flexographic R Ink 1, Water-based Flexographic G Ink 1 and Water-based Flexographic B Ink 1 prepared in the procedure (c) of Example 1, the pixel transfer film was overprinted by the wet-on-wet method. The printed pixel transfer film was introduced into a drying station, dried with wind there, dipped in water to strip off the perforated film layer together with surplus dried inks deposited thereon, washed, and then dried. Subsequently, the film was introduced into a hot dryer, where the coating film with the pixels printed thereon was baked and cured at 180° C. to obtain a PET film with a pixel pattern of the three RGB primary colors printed on the release layer (hereinafter called "Transfer Film 2").

(c) Fabrication of CF by Transfer Process

Following the procedure (e) of Example 1, an adhesive was applied over the entire surface of Transfer Film 2 obtained above in the procedure (a), and on a glass-made CF substrate on which a BM had been formed by chromium evaporation, Transfer Film 2 was adhered. The PET film was peeled off, followed by washing and drying to obtain a glass-made CF with pixels transferred on the glass substrate.

Example 3

(a) Preparation of Red, Green and Blue Pigment Dispersions

In accordance with the formulas shown below in Table 3, the red pigment mixture, green pigment mixture or blue pigment mixture was used. A solution of Polymer 2 and deionized water were added, followed by agitation for 2 hours in a dissolver. After confirming that aggregates of the pigment were no longer contained, dispersion processing was conducted at a circumferential speed of 14 m/s by using the same horizontal, medium-containing disperser as that employed in Example 1. Filtration was then conducted through a 400-mesh stainless screen. Those operations were repeated to prepare red, green and blue pigment dispersions. By the particle size measuring instrument, "MODEL N-4", the average particle sizes of the pigment dispersions of the individual colors were measured. Their average particle sizes were found to fall within a range of from 80 to 110 nm. The solution of Polymer 2, which was used as a pigment dispersant solution, had been prepared by mixing a styrene-methacrylic acid-alkyl methacrylate copolymer resin (acid value: 97, weight average molecular weight: approx. 32,000; 100 parts) with butyl cellosolve (50 parts), butyl carbitol (50 parts), and neutralizing aqueous ammonia and water (150 parts in total) and heating and dissolving the resultant mixture at 80° C. for 5 hours into a 40% aqueous resin solution.

TABLE 3

| Kinds and Amounts (parts) of Materials Used for the Preparation of Pigment Dispersions | | | |
|---|---|---|---|
| Used materials | Red Pigment Dispersion | Green Pigment Dispersion | Blue Pigment Dispersion |
| PR254 | 23.1 | — | — |
| PG36 | — | 18.8 | — |
| PY139 | 4.9 | — | — |
| PY150 | — | 9.2 | — |
| PB15-6 | — | — | 24.4 |
| PV23 | — | — | 3.6 |
| Solution of Polymer 2 | 14.0 | 14.0 | 14.0 |
| Water | 58.0 | 58.0 | 58.0 |
| Total | 100.0 | 100.0 | 100.0 |

(b) Preparation of Inkjet Printing Inks

Red, green and blue pigment inks for inkjet printers (hereinafter abbreviated as "IJ inks") were each prepared by adding a mixture of diethylene glycol monoethyl ether (5 parts), "SURFYNOL 465" (trade name, product of Air Products and Chemicals, Inc.; 0.5 part), water (40.4 parts) and methanol (0.5 part) to the red, green or blue pigment dispersion (53.6 parts) obtained in the above procedure (a), thoroughly agitating the resulting mixture, and then filtering the mixture through a membrane filter having a pore size of 5 μm.

(c) Production of Transfer Film

To form a pixel pattern of the three RGB primary colors, a CI-type IJ printing machine equipped with piezoelectric IJ printer units was provided. As the IJ printer units, two units were used per color to perform overprinting. The three sets of two printer units were connected to ink reservoirs of the red, green and blue pigment IJ inks prepared in the above procedure (b), respectively, and the printer units were individually mounted on their corresponding color stations. As a film to be printed, a PET film with polyvinyl alcohol coated as a release layer thereon, which was of the same kind as that used in Example 1, was used. The film was fed from a film supply station of the CI-type printing machine and was allowed to travel around at a speed conforming with the rotation of a central impression cylinder. Based on a pixel pattern prepared on a computer screen, the individual RGB inks were ejected from JI printer heads, respectively. After the individual colors were printed, the printed film was introduced into a drying station, dried there, and then taken up at a take-up station. A PET film with a pixel pattern of the three RGB primary colors printed on the release layer (hereinafter called "Transfer Film 3") was obtained.

(d) Fabrication of CF by Transfer Process

Following the procedure (e) of Example 1, an adhesive was then applied over the entire surface of the printed side of Transfer Film 3 obtained in the above procedure (c). On a glass-made CF substrate on which a BM had been formed by chromium evaporation, Transfer Film 3 was adhered. The PET film was then peeled off, followed by washing and drying to obtain a glass-made CF with the pixel pattern transferred on the glass substrate.

Example 4

(a) Production of Transfer Film

In the printing of the image pattern of the three RGB primary colors by the CI-type IJ printing machine in the procedure (c) of Example 3, a PET film with a release layer and perforations formed by laser abrasion, which was the same kind as that employed in Example 2, was used. Based on a pixel pattern prepared slightly greater than the perforations formed by laser abrasion, the inks of the RGB colors were ejected from the IG printer heads, respectively. After the individual colors were printed, the printed film was introduced into the drying station and, after dried with wind there, was dipped in water. The mask film was stripped off together with surplus dried inks deposited thereon, followed by washing and drying. Subsequently, the film was introduced into a hot dryer, where the pixel pattern was baked and cured to obtain a PET film with a pixel pattern of the three RGB primary colors printed on the release layer (hereinafter called "Transfer Film 4").

(b) Fabrication of CF by Transfer Process

Following the procedure (e) of Example 1, an adhesive was applied over the entire surface of Transfer Film 4 obtained above in the procedure (a), and on a glass-made CF substrate on which a BM had been formed by chromium evaporation, Transfer Film 4 was adhered. The PET film was peeled off, followed by washing and drying to obtain a glass-made CF with pixels transferred on the glass substrate.

Example 5

(a) Production of Perforated Film by Gravure Printing

On a PET film with a release layer of a cured initial methylolmelamine-polyvinyl alcohol condensation product formed thereon, perforations of an RGB pixel pattern were printed with a 30% solution of a methyl methacrylate-2-ethylhexyl methacrylate-methacrylic acid (50:20:30) copolymer in isopropanol by using a gravure printing press. A releasable PET film with a perforated mask formed thereon was obtained.

(b) Production of Transfer Film and Fabrication of CF by Transfer Process

A transfer film and CF were each produced in a similar manner as in Example 4. Using the CI-type IJ printing machine, RGB pixels were successively printed by the inkjet printing method on the releasable PET film obtained in the above procedure (a) and carrying the perforated mask formed thereon. The perforated mask layer was then removed to obtain a transfer film with the RGB pixel pattern printed thereon (hereinafter called "Transfer Film 5"). Subsequently, an adhesive was applied to Transfer Film 5, and on a glass-made CF substrate on which a BM had been formed by chromium evaporation, Transfer Film 5 was then adhered. The PET film was peeled off, followed by washing and drying to obtain a glass-made CF with pixels transferred on the glass substrate.

Example 6

(a) Production of Perforated Mask Film by Adhesion of Perforated Film

Provided was a polyimide film through which perforations of an RGB pixel pattern had been formed beforehand by laser abrasion. The polyimide film was adhered on a PET film with a release layer of a cured initial methylolmelamine-polyvinyl alcohol condensation product formed thereon. As a result, a releasable PET film with a perforated mask formed thereon was obtained.

(b) Production of Transfer Film and Fabrication of CF by Transfer Process

Using the CI-type IJ printing machine in a similar manner as in Example 4, RGB pixels were successively printed by the inkjet printing method on the releasable PET film obtained in the above procedure (a) and carrying the perforated mask formed thereon. The perforated mask layer was then peeled off to obtain a transfer film with the RGB pixel pattern printed thereon (hereinafter called "Transfer Film 6"). Subsequently, an adhesive was applied to Transfer Film 6, and on a glass-made CF substrate on which a BM had been formed by chromium evaporation, Transfer Film 6 was then adhered. The PET film was peeled off, followed by washing and drying to obtain a glass-made CF with pixels transferred on the glass substrate.

Onto the glass-made CFs obtained above in Examples 1-6, full overcoat layers were applied by a method known per se in the art. Transparent ITO electrode films were then formed by sputtering to produce CFs, respectively. By mounting those CFs, LC displays were manufactured. As these CFs can be fabricated by the fabrication process which is rational and economical and can meet the move toward larger LCDs, even large LCDs can be furnished at low cost, to say nothing of LCDs as general monitors.

Example 7

Plastic-made CFs were fabricated in a similar manner as in Examples 1-6 except that pixel patterns of the three RGB primary colors were transferred to plastic-made CF substrates, specifically methyl-methacrylate-made, polycarbonate-made and polyester-made CF substrates, respectively, in place of the glass-made CF substrates.

Example 8

PET-made CFs were fabricated in a similar manner as in Examples 1-6 except that CF substrates made of flexible PET sheets were used in place of the PET-made transfer films and RGB pixels were directly printed on the printing press or by the inkjet printing method.

Onto the plastic-made CFs obtained in Examples 7 and 8, full overcoat layers were applied by a method known per se in the art. Transparent ITO electrode films were then formed by a printing method to produce CFs, respectively. By mounting those CFs, LC displays were fabricated. As these CFs can be fabricated by the fabrication process which is rational and economical and can meet the move toward larger LCDs, even large LCDs can be furnished at low cost, to say nothing of LCDs as general monitors.

Example 9

In a similar manner as in the procedure (a) of Example 1 except for the use of PY128, PR122 and PB15-3 in place of the pigments used in the procedure (a) of Example 1, the finely-dividing processing of pigments was conducted. In a similar manner as in the procedure (b) of Example 1, the preparation of pigment dispersions was conducted. Water-based flexographic pigment inks of yellow and magenta and cyan colors were then prepared in a similar manner as in the procedure (c) of Example 1. In a similar manner as in the procedure (d) of Example 1 and the procedure (b) of Example 2, a YMC pixel transfer film was produced by flexographic printing, and in a similar manner as in the procedure (e) of Example 1 and the procedure (c) of Example 2, a CF of YMC pixels was fabricated by the transfer process. Following the procedure (b) of Example 3, inkjet printing inks of yellow, magenta and cyan colors were prepared likewise. Following the production of the transfer films in the procedure (c) of Example 3, the procedure (a) of Example 4, the procedure (b) of Example 5 and the procedure (b) of Example 6, a YMC pixel transfer film was produced. A CF of YMC pixels was then fabricated by the transfer process in a similar manner as in the procedure (d) of Example 3, the procedure (b) of Example 4, the procedure (b) of Example 5 and the procedure (b) of Example 6.

Example 10

Plastic-made CFs of YMC pixels were fabricated in a similar manner as in Example 9 except that pixel patterns of the three YMC primary colors were transferred to plastic-made CF substrates, specifically methyl-methacrylate-made, polycarbonate-made and polyester-made CF substrates, respectively, in place of the glass-made CF substrate.

Example 11

PET-made CFs of YMC pixels were fabricated in a similar manner as in Example 9 except that CF substrates made of flexible PET sheets were used in place of the PET-made transfer films and the YMC pixels were directly printed on the printing press or by the inkjet printing method.

Using the CFs obtained in Examples 9, 10 and 11, CFs for reflective LCDs were fabricated by a method known per se in the art, and then, reflective LCDs were fabricated. As these CFs can be fabricated by the fabrication process which is rational and economical and can meet the move toward larger LCDs, even large reflective LCDs can be furnished at low cost, to say nothing of reflective LCDs as general monitors.

INDUSTRIAL APPLICABILITY

According to the present invention, a pixel pattern of extremely high accuracy can be formed by printing with a central impression cylinder press a pixel pattern for a CF especially via a fixed mask through which perforations are defined in conformity with the pixel pattern, and therefore, a CF capable of showing excellent performance in image characteristics such as the fineness and definition of pixels can be obtained. The present invention can hence solve the above-described inherent defects of the conventional printing processes that the resolution and positional accuracy are insufficient.

The invention claimed is:

1. A process for the fabrication of a color filter, the process comprising
   printing, with water-based pigment inks, a pixel pattern for said color filter on a flexible plastic film through a perforated mask which is in a positive-negative relationship with said pixel pattern by a central impression cylinder press which comprises a central impression cylinder and 3 to 10 printer units arranged in a form of satellites around said central impression cylinder, and subsequently stripping off said mask,
   wherein said pixel pattern is formed of pixels of three primary colors consisting of red, green and blue or pixels of three primary colors consisting of yellow, magenta and cyan,
   wherein the printing is a flexographic printing, and
   wherein said perforated mask is (1) a mask obtained by forming a mask film over said plastic film and then forming through said mask film perforations in said negative-positive relationship with said pixel pattern by laser abrasion, (2) a mask obtained by printing, on said plastic film, a film at areas other than those corresponding to said pixel pattern to be formed, or (3) a mask which is provided with an adhesive layer and is held in place on said plastic film via said adhesive layer.

2. The process according to claim 1, wherein said flexible plastic film is a transfer or adhesion plastic film, and the pixel pattern printed on said film is transferred or adhered onto a substrate for said color filter.

3. The process according to claim 1, wherein said perforated mask is formed of (1) a material selected from the group consisting of (meth)acrylate ester-(meth)acrylic acid copolymers, styrene-(meth)acrylate ester-(meth)acrylic acid copolymers, a styrene-(meth)acrylic acid copolymer, an ethylene-vinyl acetate-(meth)acrylic acid copolymer, ethylene-(meth)acrylate ester-(meth)acrylic acid copolymers, soluble ammonium salts thereof, soluble amine salts thereof, (meth)acrylate ester-(alkoxy)polyethylene glycol(meth)acrylate copolymers, styrene-(meth)acrylate ester-(alkoxy)polyethylene glycol(meth)acrylate ester copolymers, styrene-(alkoxy)polyethylene glycol(meth)acrylate ester copolymers, methylcellulose, hydroxyethylcellulose, hydroxypropylcellulose, a cellulose acetate phthalate, a vinyl alcohol-vinyl acetate copolymer, a vinyl alcohol-ethylene copolymer, hydrophilic polyurethanes, hydrophilic polyesters, ethylene oxide-$(C_3,C_4)$alkylene oxide copolymers, and combinations thereof, or of (2) a plastic film of a material selected from the group consisting of polyesters, nylons, vinyl alcohol copolymers, a polyvinyl butyral, polyimides, polyamide-imides, a cellulose acetate, a polyethylene, a polypropylene, and combinations thereof.

* * * * *